US009516058B2

(12) United States Patent
Antonakakis et al.

(10) Patent No.: US 9,516,058 B2
(45) Date of Patent: Dec. 6, 2016

(54) METHOD AND SYSTEM FOR DETERMINING WHETHER DOMAIN NAMES ARE LEGITIMATE OR MALICIOUS

(75) Inventors: Manos Antonakakis, Dunwoody, GA (US); Roberto Perdisci, Lawrenceville, GA (US); David Dagon, Tampa, FL (US); Wenke Lee, Atlanta, GA (US)

(73) Assignee: Damballa, Inc., Atlanta, GA (US)

( * ) Notice: Subject to any disclaimer, the term of this patent is extended or adjusted under 35 U.S.C. 154(b) by 0 days.

(21) Appl. No.: 13/205,928

(22) Filed: Aug. 9, 2011

(65) Prior Publication Data

US 2012/0042381 A1 Feb. 16, 2012

Related U.S. Application Data

(60) Provisional application No. 61/372,246, filed on Aug. 10, 2010.

(51) Int. Cl.
*H04L 9/00* (2006.01)
*H04L 29/06* (2006.01)
*H04L 29/12* (2006.01)

(52) U.S. Cl.
CPC ....... *H04L 63/1483* (2013.01); *H04L 61/1511* (2013.01)

(58) Field of Classification Search
CPC ..... H04L 29/06; H04L 29/06884; H04L 63/14
USPC ............................. 726/22–25; 713/187–188
See application file for complete search history.

(56) References Cited

U.S. PATENT DOCUMENTS

| 4,843,540 A | 6/1989 | Stolfo |
| 4,860,201 A | 8/1989 | Stolfo et al. |
| 5,363,473 A | 11/1994 | Stolfo et al. |
| 5,497,486 A | 3/1996 | Stolfo et al. |
| 5,563,783 A | 10/1996 | Stolfo et al. |
| 5,668,897 A | 9/1997 | Stolfo |
| 5,717,915 A | 2/1998 | Stolfo et al. |
| 5,748,780 A | 5/1998 | Stolfo |
| 5,920,848 A | 7/1999 | Schutzer et al. |
| 6,401,118 B1 | 6/2002 | Thomas |
| 6,983,320 B1 | 1/2006 | Thomas et al. |
| 7,013,323 B1 | 3/2006 | Thomas et al. |
| 7,039,721 B1 | 5/2006 | Wu et al. |
| 7,069,249 B2 | 6/2006 | Stolfo et al. |

(Continued)

FOREIGN PATENT DOCUMENTS

| WO | WO 02/37730 | 5/2002 |
| WO | WO 02/098100 | 12/2002 |
| WO | WO 2007/050244 | 5/2007 |

OTHER PUBLICATIONS

U.S. Appl. No. 14/194,076, filed Feb. 28, 2014, Pending.

(Continued)

*Primary Examiner* — Josnel Jeudy
(74) *Attorney, Agent, or Firm* — Pepper Hamilton LLP

(57) ABSTRACT

A system and method for determining whether at least one domain is legitimate or malicious by obtaining passive DNS query information, using the passive DNS query information to measure statistical features of known malicious domain names and known legitimate domain names, and using the statistical features to determine at least one reputation for at least one new domain, where the reputation indicates whether the at least one new domain is likely to be for malicious or legitimate uses.

18 Claims, 8 Drawing Sheets

(56) References Cited

U.S. PATENT DOCUMENTS

| | | | |
|---|---|---|---|
| 7,093,292 B1 | 8/2006 | Pantuso | |
| 7,136,932 B1 | 11/2006 | Schneider | |
| 7,152,242 B2 | 12/2006 | Douglas | |
| 7,162,741 B2 | 1/2007 | Eskin et al. | |
| 7,225,343 B1 | 5/2007 | Honig et al. | |
| 7,277,961 B1 | 10/2007 | Smith et al. | |
| 7,278,163 B2 | 10/2007 | Banzhof | |
| 7,331,060 B1 | 2/2008 | Ricciulli | |
| 7,372,809 B2 | 5/2008 | Chen et al. | |
| 7,383,577 B2 | 6/2008 | Hrastar et al. | |
| 7,424,619 B1 | 9/2008 | Fan et al. | |
| 7,426,576 B1 | 9/2008 | Banga et al. | |
| 7,448,084 B1 | 11/2008 | Apap et al. | |
| 7,483,947 B2 | 1/2009 | Starbuck | |
| 7,487,544 B2 | 2/2009 | Schultz et al. | |
| 7,536,360 B2 | 5/2009 | Stolfo et al. | |
| 7,634,808 B1 | 12/2009 | Szor | |
| 7,639,714 B2 | 12/2009 | Stolfo et al. | |
| 7,657,935 B2 | 2/2010 | Stolfo et al. | |
| 7,665,131 B2 | 2/2010 | Goodman | |
| 7,698,442 B1 | 4/2010 | Krishnamurthy | |
| 7,712,134 B1 | 5/2010 | Nucci et al. | |
| 7,752,125 B1 | 7/2010 | Kothari et al. | |
| 7,752,665 B1 | 7/2010 | Robertson et al. | |
| 7,779,463 B2 | 8/2010 | Stolfo et al. | |
| 7,784,097 B1 | 8/2010 | Stolfo et al. | |
| 7,818,797 B1 | 10/2010 | Fan et al. | |
| 7,882,542 B2 | 2/2011 | Neystadt | |
| 7,890,627 B1 | 2/2011 | Thomas | |
| 7,913,306 B2 | 3/2011 | Apap et al. | |
| 7,930,353 B2 | 4/2011 | Chickering | |
| 7,962,798 B2 | 6/2011 | Locasto et al. | |
| 7,979,907 B2 | 7/2011 | Schultz et al. | |
| 7,996,288 B1 | 8/2011 | Stolfo | |
| 8,015,414 B2 | 9/2011 | Mahone | |
| 8,019,764 B1 | 9/2011 | Nucci | |
| 8,074,115 B2 | 12/2011 | Stolfo et al. | |
| 8,161,130 B2 | 4/2012 | Stokes | |
| 8,170,966 B1 | 5/2012 | Musat et al. | |
| 8,200,761 B1 | 6/2012 | Tevanian | |
| 8,224,994 B1 | 7/2012 | Schneider | |
| 8,260,914 B1 | 9/2012 | Ranjan | |
| 8,341,745 B1 | 12/2012 | Chau | |
| 8,347,394 B1 | 1/2013 | Lee | |
| 8,402,543 B1 | 3/2013 | Ranjan et al. | |
| 8,418,249 B1 | 4/2013 | Nucci et al. | |
| 8,484,377 B1 | 7/2013 | Chen et al. | |
| 8,516,585 B2 | 8/2013 | Cao et al. | |
| 8,527,592 B2 | 9/2013 | Gabe | |
| 8,631,489 B2 | 1/2014 | Antonakakis et al. | |
| 8,826,438 B2 * | 9/2014 | Perdisci | G06F 21/56 709/236 |
| 2001/0014093 A1 | 8/2001 | Yoda et al. | |
| 2001/0044785 A1 | 11/2001 | Stolfo et al. | |
| 2001/0052007 A1 | 12/2001 | Shigezumi | |
| 2001/0052016 A1 | 12/2001 | Skene et al. | |
| 2001/0055299 A1 | 12/2001 | Kelly | |
| 2002/0021703 A1 | 2/2002 | Tsuchiya et al. | |
| 2002/0066034 A1 | 5/2002 | Schlossberg et al. | |
| 2002/0166063 A1 | 11/2002 | Lachman et al. | |
| 2003/0065926 A1 | 4/2003 | Schultz et al. | |
| 2003/0065943 A1 | 4/2003 | Geis et al. | |
| 2003/0069992 A1 | 4/2003 | Ramig | |
| 2003/0167402 A1 | 9/2003 | Stolfo et al. | |
| 2003/0204621 A1 | 10/2003 | Poletto et al. | |
| 2003/0236995 A1 | 12/2003 | Fretwell, Jr. | |
| 2004/0002903 A1 | 1/2004 | Stolfo et al. | |
| 2004/0088646 A1 | 5/2004 | Yeager | |
| 2004/0111636 A1 | 6/2004 | Baffes et al. | |
| 2004/0187032 A1 | 9/2004 | Gels et al. | |
| 2004/0205474 A1 | 10/2004 | Eskin et al. | |
| 2004/0215972 A1 | 10/2004 | Sung et al. | |
| 2005/0021848 A1 | 1/2005 | Jorgenson | |
| 2005/0039019 A1 | 2/2005 | Delany | |
| 2005/0086523 A1 | 4/2005 | Zimmer et al. | |
| 2005/0108407 A1 | 5/2005 | Johnson et al. | |
| 2005/0108415 A1 | 5/2005 | Turk et al. | |
| 2005/0257264 A1 | 11/2005 | Stolfo et al. | |
| 2005/0261943 A1 | 11/2005 | Quarterman et al. | |
| 2005/0265331 A1 | 12/2005 | Stolfo | |
| 2005/0278540 A1 | 12/2005 | Cho | |
| 2005/0281291 A1 | 12/2005 | Stolfo et al. | |
| 2006/0015630 A1 | 1/2006 | Stolfo et al. | |
| 2006/0031483 A1 | 2/2006 | Lund | |
| 2006/0068806 A1 | 3/2006 | Nam | |
| 2006/0075084 A1 | 4/2006 | Lyon | |
| 2006/0143711 A1 | 6/2006 | Huang et al. | |
| 2006/0146816 A1 | 7/2006 | Jain | |
| 2006/0150249 A1 | 7/2006 | Gassen et al. | |
| 2006/0156402 A1 | 7/2006 | Stone et al. | |
| 2006/0168024 A1 | 7/2006 | Mehr | |
| 2006/0178994 A1 | 8/2006 | Stolfo et al. | |
| 2006/0200539 A1 | 9/2006 | Kappler et al. | |
| 2006/0212925 A1 * | 9/2006 | Shull et al. | 726/1 |
| 2006/0224677 A1 | 10/2006 | Ishikawa et al. | |
| 2006/0230039 A1 | 10/2006 | Shull | |
| 2006/0247982 A1 | 11/2006 | Stolfo et al. | |
| 2006/0253581 A1 | 11/2006 | Dixon | |
| 2006/0253584 A1 | 11/2006 | Dixon | |
| 2006/0259967 A1 | 11/2006 | Thomas et al. | |
| 2006/0265436 A1 | 11/2006 | Edmond | |
| 2007/0050708 A1 | 3/2007 | Gupta et al. | |
| 2007/0056038 A1 | 3/2007 | Lok | |
| 2007/0064617 A1 | 3/2007 | Reves | |
| 2007/0076606 A1 | 4/2007 | Olesinski | |
| 2007/0083931 A1 | 4/2007 | Spiegel | |
| 2007/0118669 A1 | 5/2007 | Rand et al. | |
| 2007/0136455 A1 | 6/2007 | Lee et al. | |
| 2007/0162587 A1 * | 7/2007 | Lund et al. | 709/223 |
| 2007/0209074 A1 | 9/2007 | Coffman | |
| 2007/0239999 A1 | 10/2007 | Honig et al. | |
| 2007/0274312 A1 | 11/2007 | Salmela et al. | |
| 2007/0294419 A1 | 12/2007 | Ulevitch | |
| 2008/0028073 A1 | 1/2008 | Trabe et al. | |
| 2008/0028463 A1 | 1/2008 | Dagon | |
| 2008/0060054 A1 | 3/2008 | Srivastava | |
| 2008/0060071 A1 | 3/2008 | Hennan | |
| 2008/0098476 A1 | 4/2008 | Syversen | |
| 2008/0133300 A1 | 6/2008 | Jalinous | |
| 2008/0155694 A1 | 6/2008 | Kwon et al. | |
| 2008/0177736 A1 | 7/2008 | Spangler | |
| 2008/0178293 A1 | 7/2008 | Keen et al. | |
| 2008/0184371 A1 | 7/2008 | Moskovitch | |
| 2008/0195369 A1 | 8/2008 | Duyanovich et al. | |
| 2008/0222729 A1 | 9/2008 | Chen et al. | |
| 2008/0229415 A1 | 9/2008 | Kapoor | |
| 2008/0262985 A1 | 10/2008 | Cretu et al. | |
| 2008/0263659 A1 | 10/2008 | Alme | |
| 2008/0276111 A1 | 11/2008 | Jacoby et al. | |
| 2009/0055929 A1 | 2/2009 | Lee et al. | |
| 2009/0083855 A1 | 3/2009 | Apap et al. | |
| 2009/0106304 A1 | 4/2009 | Song | |
| 2009/0138590 A1 | 5/2009 | Lee et al. | |
| 2009/0193293 A1 | 7/2009 | Stolfo et al. | |
| 2009/0198997 A1 | 8/2009 | Yeap | |
| 2009/0210417 A1 * | 8/2009 | Bennett | 707/5 |
| 2009/0222922 A1 | 9/2009 | Sidiroglou et al. | |
| 2009/0241190 A1 | 9/2009 | Todd et al. | |
| 2009/0241191 A1 | 9/2009 | Keromytis et al. | |
| 2009/0254658 A1 | 10/2009 | Kamikura et al. | |
| 2009/0254989 A1 | 10/2009 | Achan et al. | |
| 2009/0254992 A1 | 10/2009 | Schultz et al. | |
| 2009/0265777 A1 | 10/2009 | Scott | |
| 2009/0282479 A1 | 11/2009 | Smith et al. | |
| 2009/0327487 A1 | 12/2009 | Olson et al. | |
| 2010/0011243 A1 | 1/2010 | Locasto et al. | |
| 2010/0011420 A1 | 1/2010 | Drako | |
| 2010/0017487 A1 | 1/2010 | Patinkin | |
| 2010/0023810 A1 | 1/2010 | Stolfo et al. | |
| 2010/0031358 A1 | 2/2010 | Elovici et al. | |
| 2010/0034109 A1 | 2/2010 | Shomura et al. | |
| 2010/0037314 A1 | 2/2010 | Perdisci et al. | |
| 2010/0054278 A1 | 3/2010 | Stolfo et al. | |
| 2010/0064368 A1 | 3/2010 | Stolfo et al. | |

(56) References Cited

U.S. PATENT DOCUMENTS

| | | |
|---|---|---|
| 2010/0064369 A1 | 3/2010 | Stolfo et al. |
| 2010/0077483 A1 | 3/2010 | Stolfo et al. |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0041179 A1 | 2/2011 | Stahlberg |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0167495 A1 | 7/2011 | Antonakakis et al. |
| 2011/0185423 A1 | 7/2011 | Sallam |
| 2011/0185428 A1* | 7/2011 | Sallam ............................ 726/24 |
| 2011/0214161 A1 | 9/2011 | Stolfo et al. |
| 2011/0283361 A1 | 11/2011 | Perdisci et al. |
| 2012/0079101 A1 | 3/2012 | Muppala et al. |
| 2012/0084860 A1 | 4/2012 | Cao et al. |
| 2012/0117641 A1 | 5/2012 | Holloway |
| 2012/0143650 A1 | 6/2012 | Crowley et al. |
| 2012/0198549 A1* | 8/2012 | Antonakakis ....... H04L 61/1511 726/22 |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1* | 3/2014 | Ward .................. H04L 63/1425 726/22 |
| 2014/0068775 A1* | 3/2014 | Ward .................. H04L 63/1441 726/24 |
| 2014/0075558 A1* | 3/2014 | Ward .................. H04L 63/1425 726/23 |
| 2014/0090058 A1* | 3/2014 | Ward .................. H04L 63/1433 726/23 |
| 2014/0101759 A1 | 4/2014 | Antonakakis et al. |
| 2014/0157414 A1 | 6/2014 | Antonakakis et al. |
| 2014/0245436 A1 | 8/2014 | Dagon et al. |
| 2014/0289854 A1 | 9/2014 | Mahvi |
| 2014/0373148 A1 | 12/2014 | Nelms et al. |
| 2015/0026808 A1 | 1/2015 | Perdisci et al. |

OTHER PUBLICATIONS

U.S. Appl. No. 14/304,015, filed Jun. 13, 2014, Abandonded.
U.S. Appl. No. 14/616,387, filed Feb. 6, 2015, Pending.
U.S. Appl. No. 14/668,329, filed Mar. 25, 2015, Pending.
Cliff Changchun Zou et al., "Code Red Worm Propagation Modeling and Analysis", In Proceedings of 9th ACM Conference on Computer and Communications Security (CCS '02), Nov. 18, 2002.
Cliff C. Zou et al., "Email Worm Modeling and Defense", In the 13th ACM International Confrerence on Computer Communications and Networks (CCCN '04), Oct. 27, 2004.
Cliff Changchun Zou et al., "Monitoring and Early Warning for Internet Worms", In Proceedings fo the 10th ACM Conference on Computer and Communications Security (CCS '03), Oct. 2003.
Cliff Changchun Zou et al., "On the Performance of Internet Worm Scanning Strategies", Technical Report TR-03-CSE-07, Umass ECE Dept., Nov. 2003.
Alexander Gostev, "Malware Elovution: Jan.-Mar. 2005", Viruslist. com, http://www.viruslist.com/en/analysis?pubid=162454316, (Apr. 18, 2005).
Jiang Wu et al., "An Effective Architecture and Algorithm for Detecting Worms with Various Scan Techniques", In Proceedings of the 11th Annual Network and Distributed System Security Symposium (NDSS '04), Feb. 2004.

Matthew M. Williamson et al., "Virus Throttling for Instant Messaging", Virus Bulletin Conference, Sep. 2004, Chicago, IL, USA, (Sep. 2004).
F. Weimer, "Passive DNS Replication", http://www.enyo.de/fw/software/dnslogger, 2005.
Ke Wang et al., "Anomalous Payload-Based Network Intrusion Detection", In Proceedings of the 7th International Symposium on Recent Advances in Intrusion Detection (RAID 2004), 2004.
P. Vixie et al,. "RFC 2136: Dynamic Updates in the Domain Name System (DNS Update)", http://www.faqs.org/rfcs.rfc2136.html (Apr. 1997).
Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus Infection", Computer Journal, vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin—Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajas et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Proceedings of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA May 20-22, 1991; 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) HOWTO", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagn.org/dynamic (Aug. 7, 2006).

(56) References Cited

OTHER PUBLICATIONS

Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.
"InterCloud Security Service", http://ww.trendmicro.com/en/products/nss/icss/evaluate/overview.thm.
"2006 Press Releases: Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial Of Service Tools: The Shaft Case", Proceedings of the 14th Systems Administration Conference (LISA 2000), New Orleans, Louisiana, USA, Dec. 3-8, 2000.
Felix C. Freiling et al., "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al., "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of dns Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS attacks That MimicFlash rowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access For Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.

Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/articile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/.
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3il) Technologies for Homeland Defense and Law Enforcement II, Proceedings of SPIE, vol. 5071, pp. 92-104 (2003).
David Dagon et al., "Worm Population Control Through periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, pp. 1-10, Oct. 27. 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Strategic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex MA, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w.32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.

(56) References Cited

OTHER PUBLICATIONS

Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 mailed Jul. 8, 2008.
Written Opinion issued in Application No. PCT/US06/038611 mailed Jul. 8, 2008.
International Preliminary Report on Patentability issued PCT/US06/038611 mailed Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Siks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http//www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Niel Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.

Guofei Gu at al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Leyla Bilge et al., "Exposure: Finding Malicious Domains Using Passive DNS Analysis", 18th Annual Network and Distributed System Security Symposium, Feb. 6-9, 2011 (17 pages).
"Virus:Win32/Expiro.Z", http://www.microsoft.com/security/portal/Threat/Encyclopedia/Entry.aspx, Jun. 9, 2011 (5pages).
Mike Geide, "Another Trojan Bamital Pattern", http://research.zscaler.com/2011/05/another-trojan-bamital-pattern.html, May 6, 2011 (5 pages).
Sergey Golovanov et al., "TDL4—Top Bot", http://www.secuirlist.com/en/analysis/204792180/TDL4_Top_Bot, Jun. 27, 2011 (15 pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).
Phillip Porras et al, "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010, 2010 (4 pages).
P. Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of the 19th Annual Computer Security Application Conference (ACSAC'03), (11 pages) (2003).
Lala A. Adamic et al., "Zipfs Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.

(56) References Cited

OTHER PUBLICATIONS

Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.
Steven T. Eckman et al., "STATL: An Attack Language for State-Based Intrusion Detection", Journal of Computer Security, vol. 10, pp. 7-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms Via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).
Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis Via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Useix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).

David Whyte, "Exposure Maps: Removing Reliance on Attribution During Scan Detection", 1st Usenix Workshop on Hot Topics in Secrity, pp. 51-55 (2006).
Jiahal Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al,, "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http://labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart. "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysisof a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan:Java/Boonan", http://microsoft.com/security/portal/threat/encyclopedia/entry.apx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.

(56) References Cited

OTHER PUBLICATIONS

Michael Hale Ligh et al., "Malware Analyst's Cookbook and DVD", Wiley 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 Pages).
P. Porras, Changda "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "rJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behaviour", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation" RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.

Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisbilethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (205) (16 pages).
Jaeyeon Jung, "Fast Portscan Detection Using Sequential Hypothesis Testing", In Proceedings of IEEE Symposium on Security Privacy, pp. 211-225 (2004).

(56) References Cited

OTHER PUBLICATIONS

Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communcatios Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications(SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32.IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDS—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).

Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et at., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
The Conficker Working Group,"Conficker Working Group: Lessons Learned", Conficker_Working_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al. , "Protocol Modifications for the DNS Security Extensions", htp://www.ietf.org/rfc/rfc4035.txt, Mar. 2005 (50 pages).
R. Arends et al. , "DNS Security Introduction and Requirements", htp://www.ietf.org/rfc/rfc4033.txt, Mar. 2005 (20 pages).
R. Arends et al. , "Resource Records for the DNS Security Extensions", htp://www.ietf.org/rfc/rfc4034.txt, Mar. 2005 (28 pages).
Andreas Berger et al., "Assessing the Real-World Dynamics of DNS", Lecture Notes in Computer Science, vol. 7189, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).
Nicolas Falliere et al., "W32 Stuxnet Dossier", http://www.symantec.com/content/en/us/enterprise/media/security_response/whitepapers/w32_stuxnet_dossier.pdf, Feb. 2011 (69 pages).
Steinar H. Gunderson, "Global IPv6 Statistics: Measuring the Current State of IPv6 for Ordinary Users", http://meetings.ripe.net-57/presentations/Colitti-Global_IPv6_statistics_-_Measuring_the_current_state_of_IPv6_for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.
Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).
Zhuoging Morley Mao et al., "A Precise and Efficient Evaluation of the Proximity Between Web Clients and Their Local DNS Servers", In Proceedings of USENIX Annual Technical Conference (2002) (14 pages).
Mozilia Foundation, "Public Suffix List", http://publicsuffix.org/, printed May 23, 2013 (8 pages).
David Plonka et al., "Context-Aware Clustering of DNS Query Traffic", In Proceedings of the 8th IMC (2008) (13 pages).
RSA FraudAction Research Labs, "Anatomy of an Attack", http://blogs/rsa.com/rivner/anatomy-of-an-attack/, Apr. 1, 2011 (17 pages).
Steve Souders, "Sharding Dominant Domains", http://www.stevesouders.com/blog/2009/05/12/sharding-dominant-domains, May 12, 2009 (3 pages).
Paul Vixie, "What DNS Is Not", Communications of the ACM, vol. 52, No. 12, pp. 43-47, Dec. 2009.

(56) References Cited

OTHER PUBLICATIONS

N. Weaver et al., "Redirecting DNS for ADS and Profit", In USENIX Workshop on Free and Open communications on the Internet (FOCI), Aug. 2011 (6 pages).
Florian Weimer, "Passive DNS Replication", In Proceedings of the 17th Annual FIRST Conference on Computer Security Incident, Apr. 2005 (13 pages).
Manos Antonakakis et al., "Unveiling the Network Criminal Infrastructure of TDSS/TDL4", http://www.damballa.com/downloads/r_pubs/Damballa_tdss_tdl4_case_study_public.pdf, (undated) (16 pages), Aug. 28, 2012.
Manos Antonkakis et al., "From Throw-Away Traffic to Bots: Detecting the Rise of DGA-Based Malware", In Proceedings of the 21st USENIX Conference on Security Symposium (Security'12), (2012) (16 pages).
T. Berners-Lee et al., "RFC3986—Uniform Resource Identifier (URI): Generic Syntax", http://www.hjp.at/doc/rfc/rfc3986.html, Jan. 2005 (62 pages).
Juan Caballero et al., "Measuring Pay-Per-Install: The Commoditization of malware Distribution", In Proceedings of the 20th USENIX Conference on Security (SEC'11), (2011) (16 pages).
Chih-Chung Chang et al., "LIBSVM: A Library for Support Vector Machines" ACM Transactions on Intelligent Systems and Technology 2011, Last Updated Jun. 14, 2007 (26 pages).
D. De La Higuera et al., "Topology of Strings: Median String is NP-Complete", Theoretical Computer Science, vol. 230, pp. 39-48 (2000).
Dennis Fisher, "Zeus Source Code Leaked", http://threatpost.com/en_us/blogs/zeus-source-code-leaked-051011, May 10, 2011 (6 pages).
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).
Grefoire Jacob, "Jackstraws: Picking Command and control Connections from Bot Traffic", In Proceedings of the 20th USENIX Conference on Security (SEC'11) (2011) 16 pages).
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Team Cymru, "Developing Botnets", http://www.team-cymru.com/ReadingRoom/Whitepapers/2010/developing-botnets.pdf (2010) (3 pages).
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008, Conference on Data Communications (SIGCOMM'08), pp. 171-182, Aug. 17-22, 2008.
Nello Cristianini et al., "An Introduction to Support Vector Machines: and other Kernal-Based Learning Methods", Cambridge University Press, New York NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).
https://sie.isc.org/, retrieved fro Internet Archive on May 23, 2013, Archived Dec. 29, 2008 (2 pages).
http://damballa.com, retrieved from Internet Archive on May 23, 2013, Archived Jan. 28, 2007 (10 pages).
http://www.dnswl.org, retrieved from Internet Archive on May 23, 2013, Archived Jul. 15, 2006 (4 pages).
http://www.spamhaus.org/sbl/, rerieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on May 23, 2013, Archived Apr. 12, 2008 (1 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www.matasano.com/log/930/side-channel-detection-attacks-against-unauthorized-hypervisors/, Aug. 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 (pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
File History of U.S. Appl. No. 13/309,202.
File History of U.S. Appl. No. 13/008,257.
File History of U.S. Appl. No. 13/749,205.

(56) References Cited

OTHER PUBLICATIONS

File History of U.S. Appl. No. 14/015,661.
File History of U.S. Appl. No. 14/194,076.
File History of U.S. Appl. No. 12/538,612.
File History of U.S. Appl. No. 14/015,621.
File History of U.S. Appl. No. 14/041,796.
File History of U.S. Appl. No. 14/096,803.
File History of U.S. Appl. No. 14/304,015.
File History of U.S. Appl. No. 14/305,998.
File History of U.S. Appl. No. 14/317,785.
File History of U.S. Appl. No. 14/616,387.
File History of U.S. Appl. No. 14/668,329.
File History of U.S. Appl. No. 11/538,212.
File History of U.S. Appl. No. 12/985,140.
File History of U.S. Appl. No. 13/358,303.
File History of U.S. Appl. No. 14/010,016.
File History of U.S. Appl. No. 14/015,582.
File History of U.S. Appl. No. 14/015,663.
File History of U.S. Appl. No. 14/015,704.
File History of U.S. Appl. No. 15/019,272.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).

\* cited by examiner

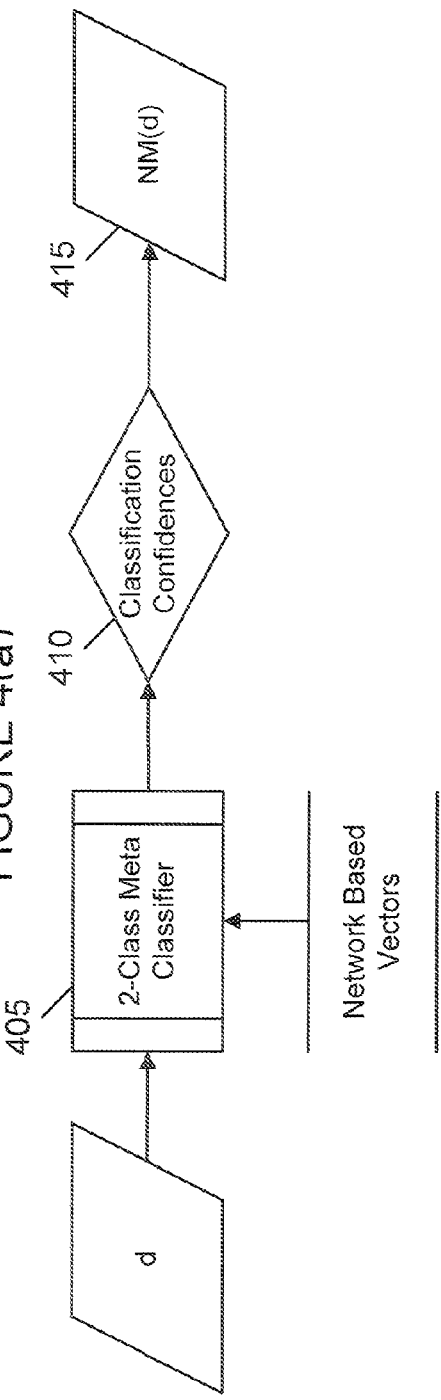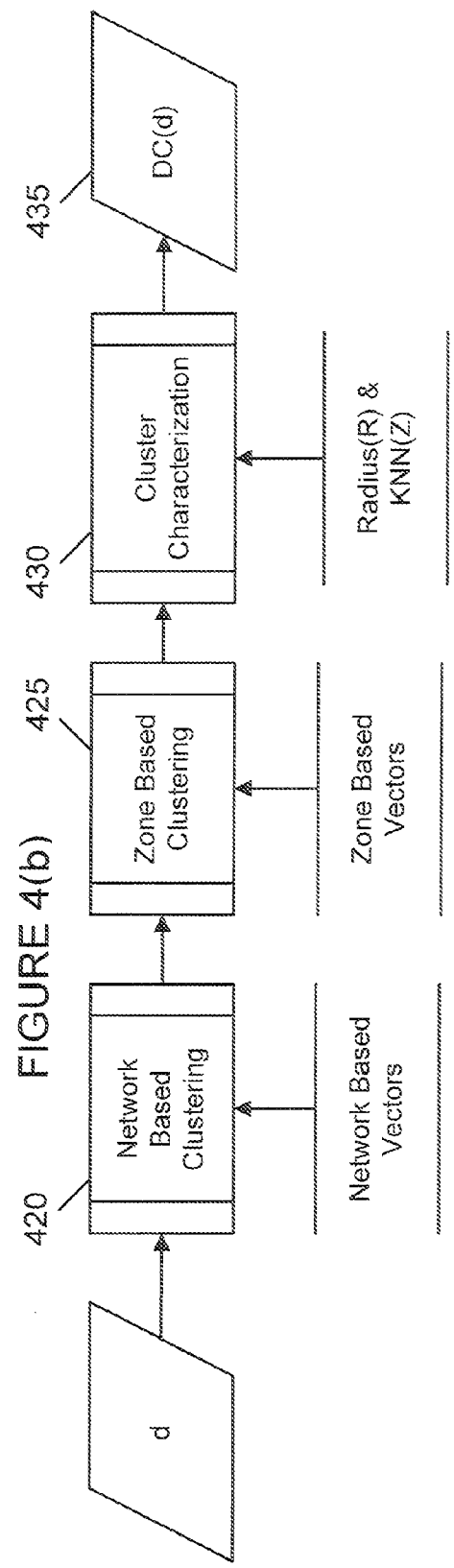

METHOD AND SYSTEM FOR DETERMINING WHETHER DOMAIN NAMES ARE LEGITIMATE OR MALICIOUS

CROSS-REFERENCE TO RELATED APPLICATION

This application claims priority to provisional application 61/372,246, filed on Aug. 10, 2010, the entirety of which is herein incorporated by reference.

BRIEF DESCRIPTION OF THE FIGURES

FIG. 4(a) illustrates a high level overview of a network profile modeling module, according to an embodiment.

FIG. 4(b) illustrates network-based clustering, zone-based clustering, and cluster characterization, according to an embodiment.

DETAILED DESCRIPTION OF EMBODIMENTS OF THE INVENTION

Figure 1:
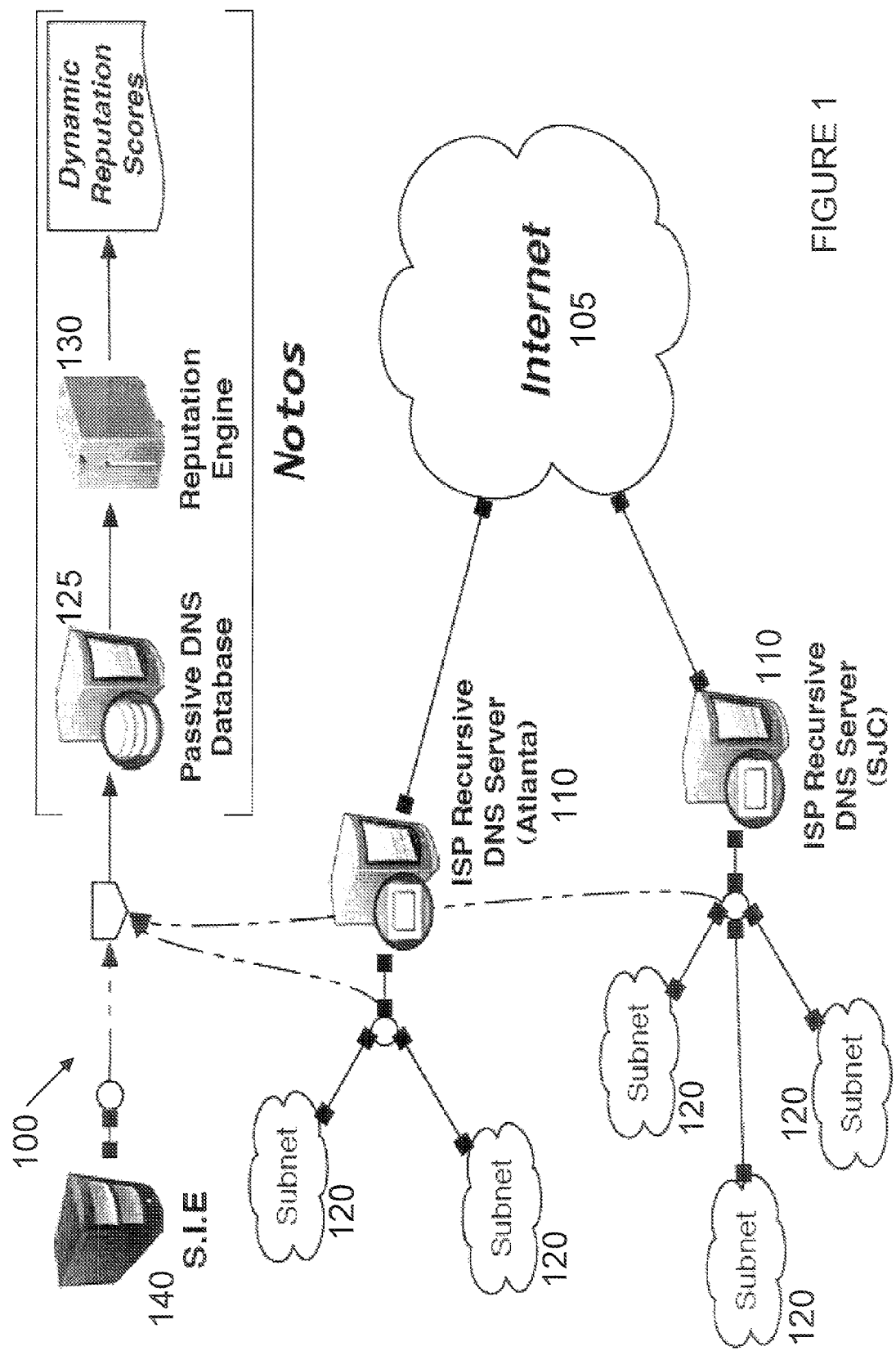
FIG. 1 illustrates a system for detecting whether a domain name is legitimate or malicious, according to an embodiment.

FIG. 1 illustrates a system 100 for detecting whether a domain name is legitimate or malicious, according to one embodiment. The system 100 may assign reputation scores to domain names. A domain name may comprise a set of substrings separated by a period. The rightmost substring is called the top level domain (TLD). The second level domain (2LD) represents the two rightmost substrings separated by a period; the third level domain (3LD) represents the three rightmost substrings separated by a period. For example, given the domain name a.b.example.com, the TLD is "corn", the 2LD is "example.com", and the 3LD is "b.example-.com". Given a domain name, a reputation score (e.g., low) may be assigned to the domain name if the domain name is associated with malicious activities. Another reputation score (e.g., high) may be assigned to the domain name if the domain name is associated with legitimate Internet services.

System 100 may comprise: a network (e.g., Internet 105), an Internet service provider (ISP) recursive domain name system (rDNS) servers 110 (e.g., one in Atlanta, and one in San Jose), subnets 120, a security information exchange (SIE) 140, a passive domain name system (pDNS) database 125, or a reputation engine 130, or any combination thereof. Historical information about domain names and their resolved IP addresses may be collected, using the Internet 105, from real-world DNS traffic from multiple diverse geographical locations using subnets 120. Each ISP rDNS 110 can collect this historical information (e.g., 30,000 queries per second during peak hours) from various subnets 120 and send this historical information to the pDNS database 125.

In addition, DNS traffic may also be collected from alternative passive DNS collectors (i.e., SIE) 140, which may aggregate DNS traffic generated by a large number of rDNS servers across large areas (e.g., North America, Europe, etc.). For example, SIE project may process 200 Mb/s of DNS messages, which is several times the total volume of single US ISP.

In addition to storing the historical information collected by the ISP rDNS 110 and the SIE 140, the pDNS database 125 may also store additional information, such as a list or multiple lists of known malicious domain names. These lists of known malicious domain names may be created or updated by running known malware samples in a controlled environment, and then classifying all the domain names contacted by the malware samples that do not match a pre-compiled white list (e.g., a large list of popular, legitimate domain names from Alexa.com). In addition, domain names, which do not match a pre-compiled white list, may be extracted from spam emails collected using a spam-trap.

The reputation engine 130 may utilize the information stored in the pDNS database 125 to determine the reputation of new domain names. Additional information about how the reputation engine 130 is utilized is described below.

Figure 5:
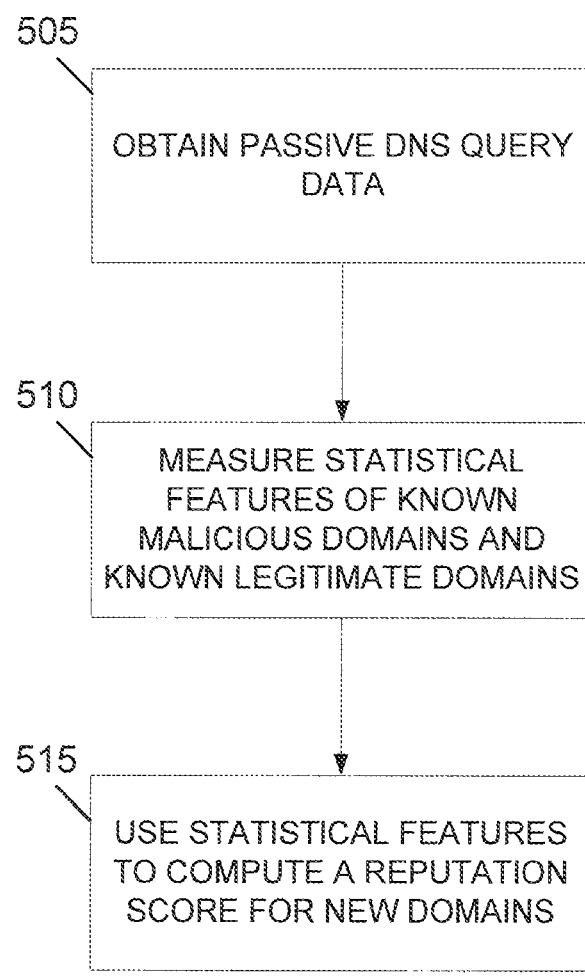
FIG. 5 illustrates a method for detecting whether a domain name is legitimate or malicious, according to an embodiment.

FIG. 5 illustrates a method 500 for determining whether at least one domain name is legitimate or malicious, according to an embodiment. In 505, pDNS query information may be obtained. For example, information about the set of IP addresses to which the domain name points may be obtained. Then, the pDNS database 125 may retrieve the related historic IP address (RHIP) information and the related historic domain name (RHDN) information. The RHIP address information may comprise the set of IP addresses ever pointed to by the domain name, the set of IP addresses ever pointed to the 3LD of the domain name, and the set of IP addresses ever pointed to the 2LD of the domain name. The RHDN information may comprise the entire set of domain names that ever resolved to an IP address or any IP address in a RHIP set.

Figure 2:
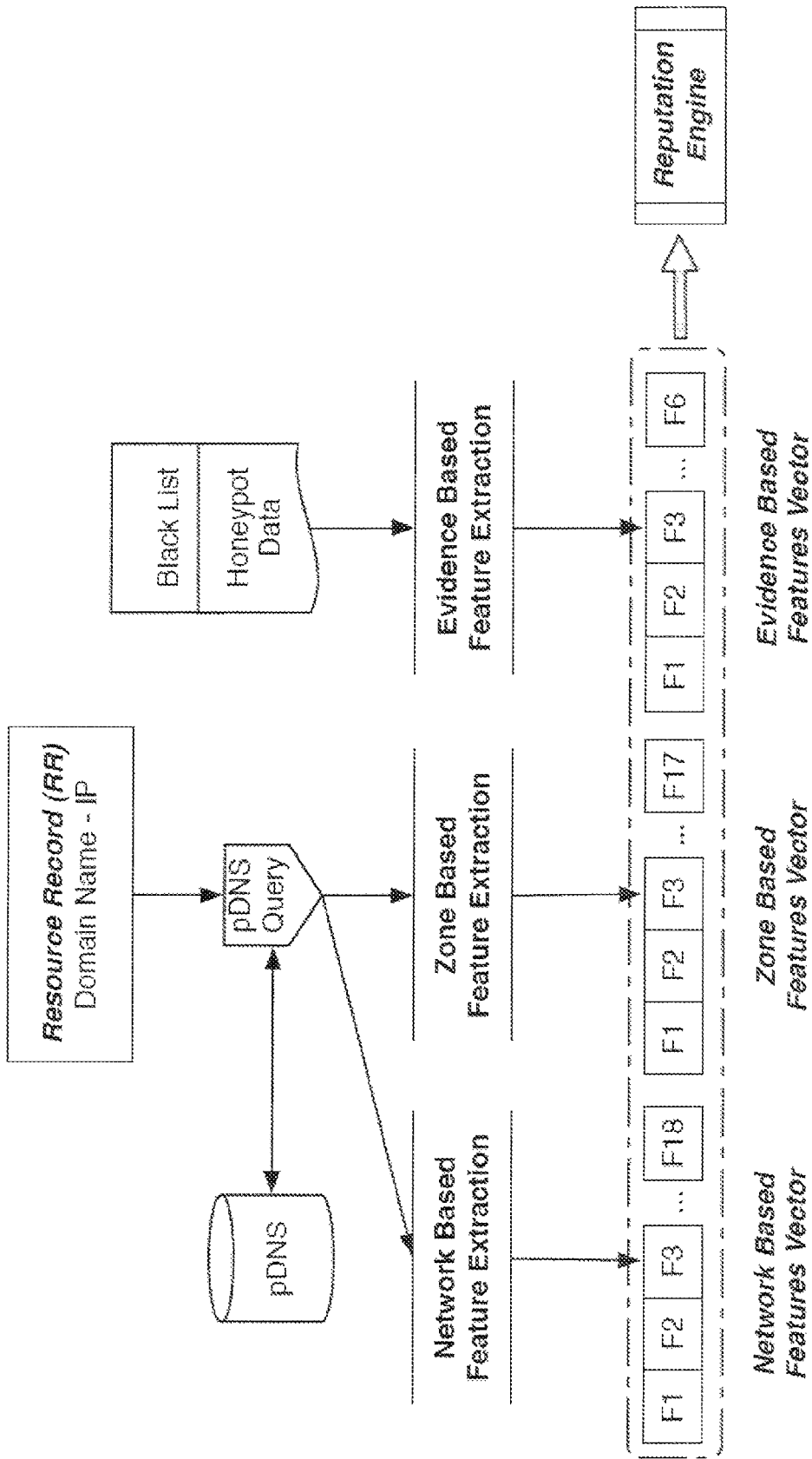
FIG. 2 illustrates example statistical features, according to an embodiment.

In 510, the pDNS query information may be utilized to measure statistical features of known malicious domain names and known legitimate domain names. The statistical features are set forth in FIG. 2, and may include, but are not limited to: network-based features, zone-based features, or evidence-based features, or any combination thereof.

Network-Based Features.

The network-based features may be extracted from the set of RHIPs. The network-based features aim to describe how the operators who own the domain name and the IPs the domain name points to allocate their network resources. Internet bad actors often abuse DNS to operate their malicious networks with a high level of agility. Thus, the domain names and IPs that are used for malicious purposes are often relatively short-lived and may be characterized by a high churn rate. This agility helps bad actors avoid some simple blacklisting techniques and/or being discovered and taken down (e.g., by law enforcement, private organizations, etc.) Quantities that may be measured using the network-based features may include, but are not limited to: the total number of IPs historically associated with the domain name, the diversity of the IPs geographical location, or the number of distinct autonomous systems (ASs) in which they reside, or any combination thereof.

In order to measure the level of agility of a domain name, numerous features that describe the domain name's network profile may be extracted. The network-based features may include, but are not limited to the following: border gateway protocol (BGP) features; AS features, or registration features, or any combination thereof. BGP features relate to BGP, which is a protocol backing core routing decisions on the Internet. It maintains a table of IP networks or 'prefixes' which designate network reachability among ASs. AS features relate to AS, which is a collection of connected Internet Protocol (IP) routing prefixes under the control of one or more network operators that presents a common, clearly defined routing policy to the Internet. Registration features relate to registration information of domain names.

For the discussion below, s will be a domain name (e.g., example.com), and Zone(s) is the set of domain names that include s and all domain names that end with a period followed by s (e.g., domains ending in example.com). Let $D=\{d_1, d_2, \ldots, d_m\}$ be a set of domain names. Let A(D) be the set of IP addresses ever pointed by any domain name d in the set D. Given an IP address a, BGP(a) is the set of all IPs within the BGP prefix of a, and AS(a) is the set of IPs located in the AS in which a resides. In addition, these functions may extend to take as input a set of IPs: given IP set $A=a_l, a_2, \ldots, a_N$, $BGP(A)=\cup_{K=1 \ldots N} BGP(a_k)$; AS(a) may be similarly extended.

With respect to RHIPs, these can comprise the union of A(d), A(Zone(3LD(d))), and A(Zone(2LD(d))). In order to simplify the notation, A(Zone(3LD(d))) and A(Zone(2LD (d))) will be referred to as $A_{3LD}(d)$ and $A_{2LD}(d)$, respectively.

BGF features may comprise, but are not limited to, the following nine features: the number of distinct BGP profiles related to BGP(A(d)), the number of countries in which these BGP prefixes reside, the number of organizations that own these BGP prefixes; the number of distinct IP addresses in the sets $A_{3LD}(d)$ and $A_{2LD}(d)$, the number of distinct BGP prefixes related to BGP($A_{3LD}(d)$) and BGP($A_{2LD}(d)$), or the number of countries in which these two sets of prefixes reside, or any combination thereof.

The AS features may include, but are not limited to, three features, namely the number of distinct autonomous systems related to AS(A(d)), AS($A_{3LD}(d)$), and AS($A_{2LD}(d)$).

The registration features may comprise, but are not limited to, six features, namely: the number of distinct registrars associated with the IPs in the A(d) set, the diversity in the registration dates related to the IPs in A(d), the number of distinct registrars associated with the IPs in the $A_{3LD}(d)$ and $A_{2LD}(d)$ sets, or the diversity in the registration dates for the IPs in $A_{2LD}(d)$ and $A_{2LD}(d)$, or any combination thereof.

While most legitimate, professionally run Internet services have a stable network profile, which is reflected into low values for the network-based features described above, the profile of malicious networks (e.g., fast-flux networks) may change relatively frequently causing the network-based features described above to be assigned higher values. A domain name from a legitimate zone may exhibit small numbers in its AS features, mainly because the IPs in the RHIP information should belong to the same organization or a very small number of different organizations. On the other hand, if a domain names participates in malicious action (e.g., dotnet activities, flux networks), then it could resign in a large number of different networks. The list of IPs in the RHIP information that corresponds to the malicious domain name may produce AS features with higher values. In the same sense, the homogeneity of the registration information for benign domains may be measured. Legitimate domains may be typically linked to address space owned by organizations that acquire and announce network blocks in some order. Thus, the registration feature values for a legitimate domain name that is owned by the same organizations may produce a list of IPs in the RHIP information that may have small registration feature values. If this set of IPs exhibits high registration features values, it may mean that it very likely resides in different registrars and was registered on different dates. Such registration features may be linked with fraudulent domains.

Zone-Based Features.

The zone-based features may be extracted from the set of RHDNs. The zone-based features may measure the characteristics of the set RHDNs of domain names historically associated with the domain names. Quantities that may be measured include, but are not limited to: the average length of domain names in RHDNs, or the number of distinct TLDs, the occurrence frequency of different characters, or any combination thereof.

The intuition behind the zone-based features is that while legitimate Internet services may be associated with many different domain names, these domain names usually have strong similarities. For example, google.com, googlesyndication.com googlewave.com are all related to Internet services provided by Google, and contain the string "google" in their name. On the other hand, malicious domain names related to the same spam campaign, for example, often look randomly generated, and share few common characteristics. Therefore, the zone-based features aim at measuring the level of diversity across the domain names in the RHDNs set.

The zone-based features may include, but are not limited to: string features and/or TLD features. The string features may include, but are not limited to, the following twelve features: the number of distinct domain names in RHDNs; the average and standard deviation of their length; the mean, median and standard deviation of the occurrence frequency of each single character in the domain names strings in RHDNs; the mean, median and standard deviation of the distribution of 2-grams (e.g., pairs of characters); the mean, median and standard deviation of the distribution of 3-grams.

The RLD features may include, but are not limited to the following five features: the number of distinct TLD strings that are obtained from the top-level domain; the ratio between the number of domain names whose top level domain is .com; the total number of TLDs different from .com; or the main, median, and standard deviation of the occurrence frequency of the TLD strings; or any combination thereof.

Note that whenever the mean, median and standard deviation of a certain property is measured, it may be done in order to summarize the shape of its distribution. For example, by measuring the mean, median, and standard deviation of the occurrence frequency of each character in a set of domain name strings, the distribution of the character frequency is shown.

Evidence-Based Features.

Evidence-based features try to determine to what extent a given domain names is associated with other known malicious domain names or IP addresses. As mentioned above, the knowledge based of known suspicious, malicious, and legitimate domain names and IPs may be collected. The evidence-based features may include the measurement of quantities such as, but not limited to: distinct malware samples that contacted the domain name, or the number of malware samples that connected to any of the IPs pointed by the domain name, or any combination thereof.

The evidence-based features may include, but are not limited to: honeypot features and/or blacklist features. The honeypot features may include, but are not limited to, the following three features: the number of distinct malware samples that, when executed, try to contact the domain name or any IP address in A(d); the number of malware samples that contact any IP address in BGP(A(d)); or the number of samples that contact any IP address in AS(A(d)); or any combination thereof.

The blacklist features may include, but are not limited to, the following three features: the number of IP addresses in A(d) that are listed in public IP blacklists; the number of IPs in BGP(A(d)) that are listed in IP blacklists; or the number of IPs in AS(A(d)) that are listed in IP blacklists; or any combination thereof. The blacklist features may be used to identify the re-utilization of known malicious network resources such as IPs, BGPs or even ASs.

Figure 3:
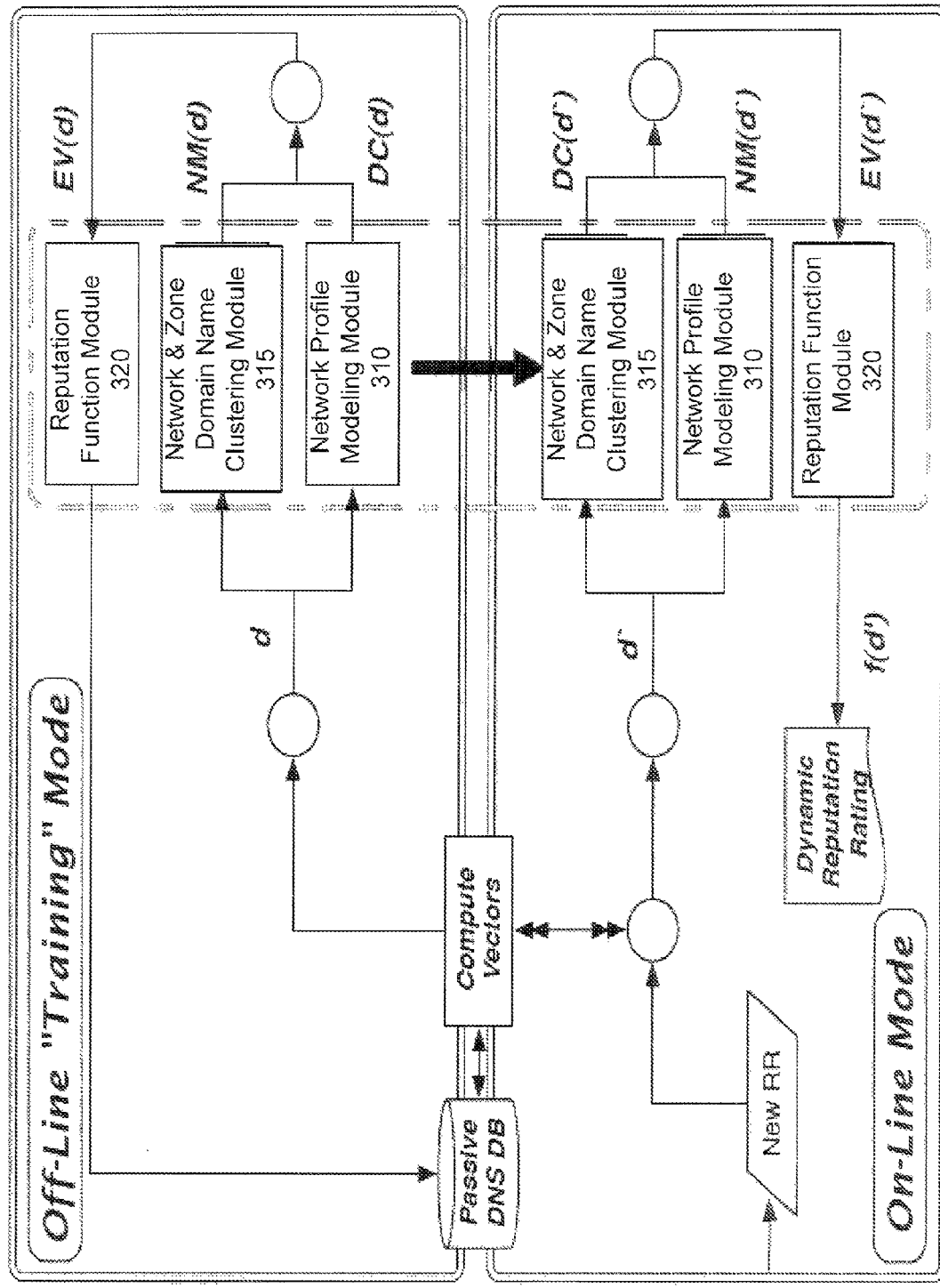
FIG. 3 illustrates the off-line training mode and the on-line training mode, according to an embodiment.

Referring back to FIG. 5, in 515, the information compiled using the statistical features may be utilized by the reputation engine 130 to compute a reputation score for a new domain name, where the reputation score indicates whether the new domain name is likely to be for malicious or legitimate uses. The reputation engine 130 may operate in an off-line training mode and/or an online classification mode. FIG. 3 illustrates the off-line training mode and the on-line training mode. During the off-line training mode, the reputation engine 130 may be trained using the information gathered from a knowledge base, which may be the set of known malicious and legitimate domain names and their related IP addresses. Afterward, during the on-line mode, for each new domain name, the off-line and on-line modes may be utilized to compute the reputation scores.

Off-Line Training Mode.

During off-line training, the reputation engine 130 may build different modules. For example, referring to FIG. 3, in one embodiment, the following modules may be built: the network profile modeling module 310; the network and zone domain name clustering module 315; or the reputation function module 320; or any combination thereof.

Network Profile Modeling Module.

The network profile modeling module 310 may be a model of how well-known networks behave. For example, the network characteristics of popular content delivery networks (e.g., Akamai, Amazon CloudFront, etc.) and/or large popular websites (e.g., google.com, yahoo.com, etc.) may be modeled. FIG. 4(*a*) illustrates a high level overview of a network profile modeling module 310, according to an embodiment. For any new domain name d, it is fed into a classifier 405 (e.g., 2-class meta) that classifies the domain name d based on models for classes of known domain names. The classification confidence 410 may assign a score indicating the confidence that the new domain name d is in fact part of a known class. For example, multiple sets of domain names that share similar characteristics may be selected, and their network features (as described above) may be learned. The network features may then be used to train a statistical classifier, which will be able to recognize whether a new domain name has network characteristics similar to the popular websites that were utilized. In one embodiment, any or all of the following classes of domain names may be utilized when choosing the multiple sets of domain names from which the network features are utilized. (It should be noted that any other class of domain names may also be utilized.)

Popular Domain Names. This class may comprise a large set of domain names under the following DNS zones: google.com, yahoo.com, amazon.com, ebay.com, msn.com, live.com, myspace.com, and facebook.com.

Common Domain Names. This class may comprise domain names under the top one hundred zones, according to Alexa. This class may exclude all the domain names already included in the Popular Domain Name class.

Akamai Domain Names. Akamai is a very large content delivery network (CDN), and the domain names related to this CDN may have very peculiar network characteristics. In order to model the network profile of Akamai's domain names, a set of domain names may be collected under, for example, any or all of the following zones: akafms.net, akamai.net, akamaiedge.net, akamai.com, akadns.com, and akamai.com.

CDN Domain Names. This class may comprise domain names related to CDNs other than Akamai. For example, domain names may be collected under any or all of the following zones: panthercdn.com, llnwd.net, cloudfront.net, nyud.net, nyucd.net, and redcondor.net. In one embodiment, separating the CDN domain names and the Akamai's domain names may be useful because the Akamai domain names may have a very unique network profile, and learning two separate models for these classes may help achieve better classification accuracy.

Dynamic DNS Domain Names. This class may comprise a large set of domain names registered under either or both of some of the largest dynamic DNS providers: No-IP (www.no-ip.com) and DynDNS (www.dyndns.com).

For each class of domain names described above, a statistical classifier may be trained in order to distinguish between the classes from each other. Therefore, in one embodiment, five different statistical classifiers may be trained. Thus, given a new domain name, the network profile modeling module may be able to determine whether the new domain name's network profile looks like the profile of: a Popular Domain Name, a Common Domain Name, an Akamai Domain Name, a CDN Domain Name, or a Dynamic DNS Domain Name, or any combination thereof.

Network and Zone Domain Name Clustering Module.

The network and zone domain name clustering module 315 may take the domain names collected in the pDNS database 125 and build clusters of domain names that share similar network-based features and zone-based features (as described above). As shown in FIG. 4(*b*), network-based clustering is done in 420 using the network-based features, and then zone-based clustering is done in 425 using the zone-based features, then cluster characterization is done is 430.

The network-based clustering may be done to group together domain names that share the same level of agility. For example, the network-based clustering may group together domain names with similar stable network characteristics, and separate them from domain names related to CDNs or malicious flux network.

The zone-based clustering 425 may be done after clustering the domain names according to their network-based features in order to split the network-based clusters of domain names into finer groups. In zone-based clustering 425, domain names that are in the same network-based cluster that also share similar zone-based features may be grouped together. Each element of the cluster may be a domain name—IP pair. These two groups of domain names may have belonged to the same network cluster, but were separated into two different clusters by the zone-based clustering phase. For example, consider the domain names $d_1$=e55.g.akamaiedge.net from the first cluster, and $d_2$=spzr.in from the second cluster. The reason why $d_1$ and $d_2$ were clustered in the same network-based cluster may be because the set of RHIPs (described above) for $d_1$ and $d_2$ have similar characteristics. In particular, the network agility properties of $d_2$ make it look like it was part of a large CDN. However, when the set of RHDNs (described above) for $d_1$ and $d_2$ is considered, it is found that the zone-based features of $d_1$ are much more stable than the zone-based features of $d_2$. In other words, while the RHDNs of $d_1$ share strong domain name similarities (e.g., they all share the substring "akamai") and have low variance of the string features (described above), the strong zone agility properties of $d_2$ may affect the zone-based features measured on $d_2$'s RHDNs and may make $d_2$ look very different from $d_1$.

Figure 6:
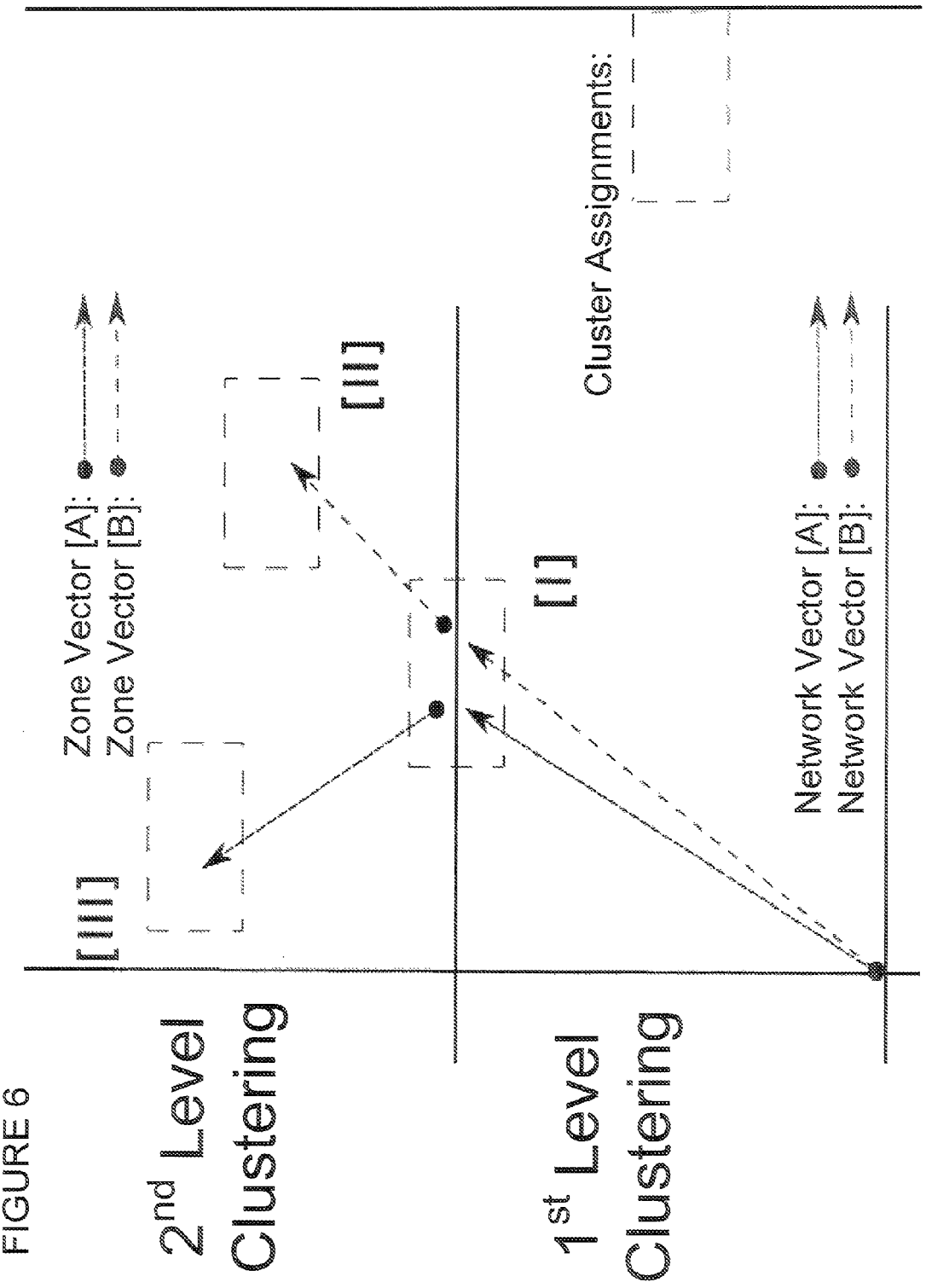
FIG. 6 illustrates network and zone-based clustering, according to an example embodiment.

For example, referring to FIG. 6, a network and zone based clustering process is illustrated in the case of an Akamai (A) and a malicious (B) domain name. The 1st level clustering may be based on network-based features. The 2nd level clustering may be based on zone based features. As shown in FIG. 6, the Akamai domain name is clustered very differently from the malicious domain name when both the network-based and zone-based features are considered.

Referring back to FIG. 3, once the network profile modeling module 310 has been used to build a model of well-known network profiles, and the network and zone clustering module 315 has been used to build the domain name clusters, this information may be fed into the reputation function module 320. The reputation function module 320 may aim to assign a reputation score in the interval [0, 1] to domain names, with 0 meaning a low reputation (e.g., likely malicious) and 1 meaning a high reputation (e.g., likely legitimate). The reputation function module 320 may be implemented as a statistical classifier. In order to train the reputation function module 320, each domain name d in the knowledge base of system 100 may be fed into the network profile modeling module 310 and also into the network and zone clustering module 315 to compute two output vectors DC(d) and NM(d). (Details on how these vectors are computed are described below.) In addition, for each domain name d, an evidence features vector EV(d) may be computed (as described above). The reputation function module 320 may then utilize DC(d), NM(d) and EV(d) by creating a feature vector v(d) that combine the NM(d), DC(d) and EV(d) feature vectors. The reputation function module may then be trained using the labeled dataset L={(v($d_i$), $y_i$)}, where i=1 . . . n, and where $y_i$=0 if $d_i$ is a known malicious domain name; otherwise $y_i$=1.

On-Line Mode.

Figure 7:
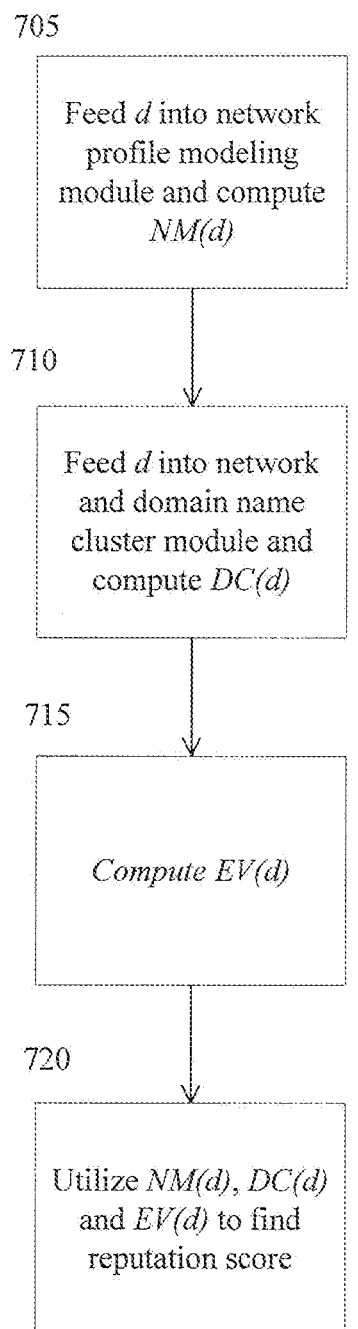
FIGS. 7-8 illustrate a method for computing a reputation score, according to an embodiment.

Referring back to FIG. 3, after training is complete in the off-line mode, the reputation engine 130 may be used in one-line mode to assign reputation scores to new domain names. For example, given an input domain name d, the reputation engine may compute a score S in the set of [0, 1]. Values of S close to zero may signify that d appears to be related to malicious activities and therefore has a low reputation. On the other hand, values of S close to one may signify that d appear to be associated with benign Internet services, and therefore may have a high reputation. FIG. 7 illustrates a method 700 for computing the reputation score, according to an embodiment. In 705, d may be fed into the network profile modeling module 310, which may comprise the five statistical classifiers described above. The output of the network profile modeling module 310 may be vector NM(d)={$c_1$, $c_2$, . . . , $c_5$}, where $c_1$ is the output of the first classifier, and may be viewed as the probability that d belongs to the class of Popular Domain Names, $c_2$ is the probability that d belongs to the class of Common Domain Names, $c_3$ is the probability that d belongs to the class of Akamai Domain Names, $c_4$ is the probability that d belongs to the class of CDN Domain Names, and $c_5$ is the probability that d belongs to the class of Dynamic DNS Domain Names.

Figure 8:
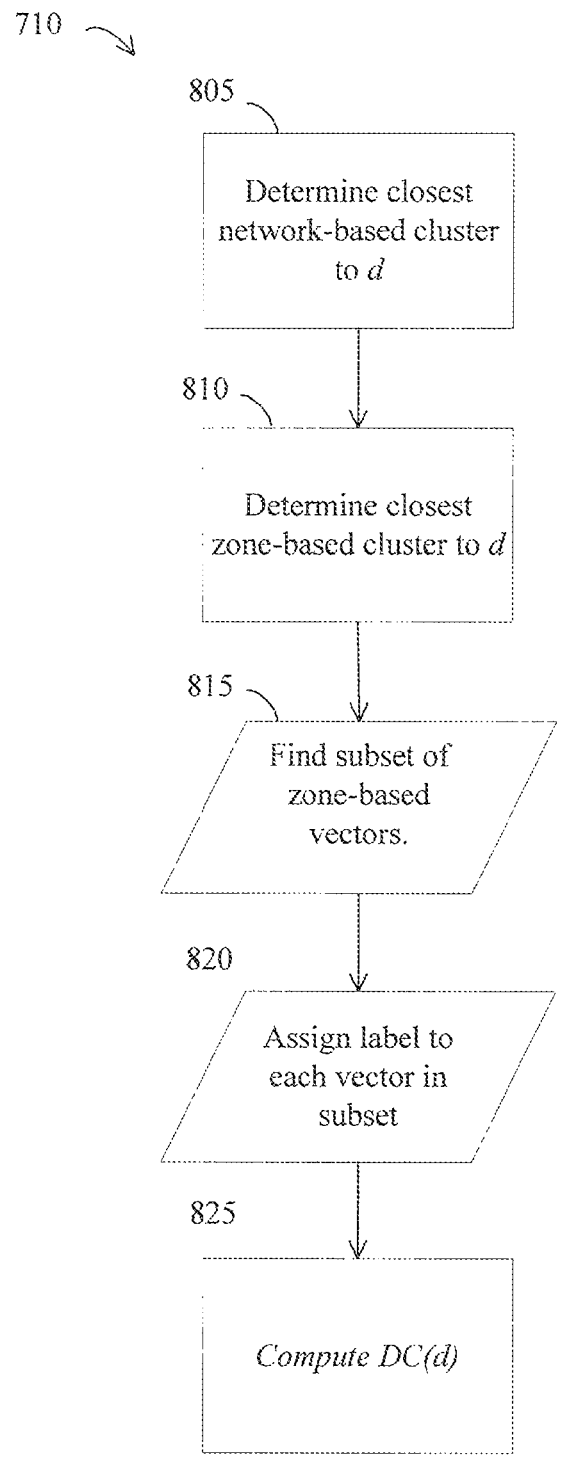

Referring back to FIG. 7, in 710, d may also be fed to the network and zone domain name clustering module 315, which may compute vector DC(d)={$l_1$, $l_2$, . . . , $l_5$}. FIG. 8 illustrates how DC(d) and elements $l_i$ may be computed, according to an embodiment. In 805, the network-based features of d may be extracted, and the closest network-based cluster to d among the network-based clusters computed by the network and zone domain name clustering module 315 may be determined. In 810, the zone-based features of d may be extracted, and the closest zone-based cluster to d among the zone-based clusters computed by the network and zone domain name clustering module 315 may be determined. Let $C_d$ be this closest zone-based cluster to d. In 815, a subset $V_d \subseteq C_d$ of all of the zone-based vectors $v_j \in C_d$ may be found when certain conditions exist. In one embodiment, the certain conditions may be the following: (A) dist($z_d$, $v_j$)<R, where $z_d$ is the zone-based vector for d, and R is a predefined radius; and/or (B) $V_j \in$ KNN($z_d$), where KNN($z_d$) is the set of k nearest-neighbors of $z_d$.

In 820, a label may be assigned to each vector in the subset of the zone-based vectors. Because the zone-based vectors in $V_d$ may be the training vectors, they may be related to domain names extracted in a knowledge base. Thus, a label may be assigned to each vector $v_i \in V_d$, according to the nature of the domain name $d_i$ from which $v_i$ was computed. In one embodiment, multiple different classes of domain names may be distinguished, including, but not limited to: popular domain names, common domain names, Akamai domain names, CDN domain names, dynamic DNS domain names, span domain names (e.g., DEFINE), flux domain names (e.g., DEFINE), and malware domain names (e.g., DEFINE). Note that many other classes of domain names may be utilized.

In 825, in order to compute DC($d_i$), in one embodiment, the following five statistical features may be computed: the majority class label L (which may be the label that appears the most among the vectors $v_i \in V_d$) (e.g., L may be equal to malware domain name); the standard deviation of label frequencies (e.g., given the occurrence frequency of each label among the vectors $v_i \in V_d$, their standard deviation may be computed); or the mean, median and standard deviation of the distribution of distances between $z_d$ and the vectors $v_i \in V_d^{(L)}$ (e.g., given the subset $V_d^{(L)} \subseteq V_d$ of vectors in $V_d$ that are associated with label L); or any combination thereof. Note that many other statistical features may be utilized.

Referring back to FIG. 7, in 715, once the vectors NM(d) and DC(d) are computed, the evidence vector EV(d) may be computed, as described above. In 720 these three vectors may be concatenated into a sixteen-dimensional feature vector v(d), which may be input to the trained reputation function module 320. The trained reputation function module 320 may then compute a score S=1−f(d), where f(d) may be the probability that d is a malicious domain name. S may then vary, with the lower the value of S, the lower d's reputation, and the higher the value of S, the higher d's reputation.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than those shown. For example, the elements in the flowcharts may be performed in parallel or a different order.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

It should also be noted that the terms "a", "an", "the", "said", etc. signify "at least one" or "the at least one" in this application (e.g., specification, claims and drawings).

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method of detecting malicious network behavior by teaching at least one reputation engine to determine whether at least one new domain name is likely to be used for malicious or legitimate uses, the method comprising:
   obtaining passive domain name system (DNS) query information, utilizing the at least one reputation engine in communication with at least one database, wherein the passive DNS query information is obtained using passive DNS collectors from DNS information;
   utilizing, using the at least one reputation engine, the passive DNS query information to measure statistical features of known malicious domain names and known legitimate domain names, wherein the statistical features comprise network-based features and/or zone-based features, the network-based features describing how operators who own the at least one domain name and IP addresses the at least one domain name points to are able to allocate their network resources, and the zone-based features measuring a set of related historic domain names (RHDNs) of domain names historically associated with the at least one new domain name; and
   utilizing the statistical features to determine at least one reputation for the at least one new domain name, by teaching the at least one reputation engine to determine whether the at least one new domain name is likely to be used for malicious or legitimate uses, and thus determine if the network communication is malicious or benign.

2. The method of claim 1, wherein the statistical features also comprise: evidence-based features.

3. The method of claim 1, wherein the network-based features comprise: border gateway protocol (BGP) features, autonomous system (AS) features, or registration features, or any combination thereof.

4. The method of claim 1, wherein the zone-based features comprise: string features and/or top level domain (TLD) features.

5. The method of claim 4, wherein the evidence-based features comprise: honeypot features and/or blacklist features.

6. The method of claim 1, wherein at least one reputation engine is utilized to determine the at least one reputation for the at least one new domain.

7. The method of claim 6, wherein the at least one reputation engine comprises: at least one network profile modeling module; at least one network and zone domain name clustering module; or at least one reputation function module; or any combination thereof.

8. The method of claim 7, wherein the at least one network profile modeling module utilizes multiple classes of domain names.

9. The method of claim 8, wherein the multiple classes of domain names comprise: popular domain names; common domain names, Akamai domain names, content delivery network (CDN) domain names, or dynamic DNS domain names, or any combination thereof.

10. A system of detecting malicious network behavior by teaching at least one reputation engine to determine whether at least one new domain name is likely to be used for malicious or legitimate uses, the system comprising:
    at least one reputation engine in communication with at least one hardware processor and at least one database, the at least one reputation engine configured for:
    obtaining passive domain name system (DNS) query information, wherein the passive DNS query information is obtained using passive DNS collectors;
    utilizing the passive DNS query information to measure statistical features of known malicious domain names and known legitimate domain names, wherein the statistical features comprise network-based features and/or zone-based features, the network-based features describing how operators who own the at least one domain name and IP addresses the at least one domain name points to are able to allocate their network resources, and the zone-based features measuring a set of related historic domain names (RHDNs) of domain names historically associated with the at least one new domain name; and
    utilizing the statistical features to determine at least one reputation for the at least one new domain name, by teaching the at least one reputation engine to determine whether the at least one new domain name is likely to be used for malicious or legitimate uses, and thus determine if the network communication is malicious or benign.

11. The system of claim 10, wherein the statistical features also comprise: evidence-based features.

12. The system of claim 10, wherein the network-based features comprise: border gateway protocol (BGP) features, autonomous system (AS) features, or registration features, or any combination thereof.

13. The system of claim 10, wherein the zone-based features comprise: string features and/or top level domain (TLD) features.

14. The system of claim 13, wherein the evidence-based features comprise: honeypot features and/or blacklist features.

15. The system of claim 10, wherein the at least one reputation engine is utilized to determine the at least one reputation for the at least one new domain.

16. The system of claim 15, wherein the at least one reputation engine comprises: at least one network profile modeling module; at least one network and zone domain name clustering module; or at least one reputation function module; or any combination thereof.

17. The system of claim 16, wherein the at least one network profile modeling module utilizes multiple classes of domain names.

18. The system of claim 17, wherein the multiple classes of domain names comprise: popular domain names; common domain names, Akamai domain names, content delivery network (CDN) domain names, or dynamic DNS domain names, or any combination thereof.

* * * * *

UNITED STATES PATENT AND TRADEMARK OFFICE
CERTIFICATE OF CORRECTION

| | |
|---|---|
| PATENT NO. | : 9,516,058 B2 |
| APPLICATION NO. | : 13/205928 |
| DATED | : December 6, 2016 |
| INVENTOR(S) | : Manos Antonakakis et al. |

Page 1 of 1

It is certified that error appears in the above-identified patent and that said Letters Patent is hereby corrected as shown below:

In the Specification

At Column 1, Line 11, please insert the following paragraph:
-- STATEMENT REGARDING FEDERALLY SPONSORED RESEARCH
This invention was made with government support under grant numbers CNS0831300 awarded by the National Science Foundation, FA8750-08-2-0141 awarded by the United States Air Force Research Laboratory Information Directorate and N00014-09-1-1042 awarded by the United States Office of Naval Research. The government has certain rights in the invention. --

Signed and Sealed this
Fourteenth Day of May, 2019

Andrei Iancu
*Director of the United States Patent and Trademark Office*